J. N. SCISM.
JUNCTION BOX.
APPLICATION FILED JAN. 13, 1908.
904,458.
Patented Nov. 17, 1908.
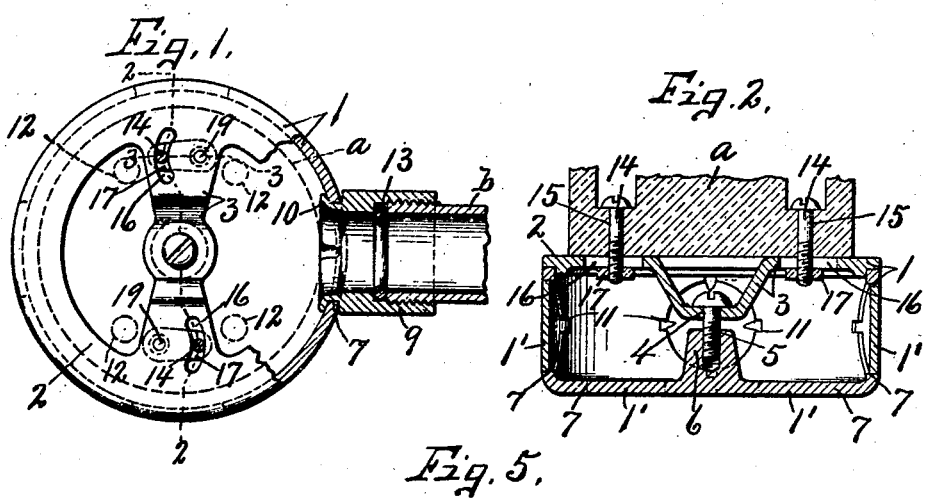
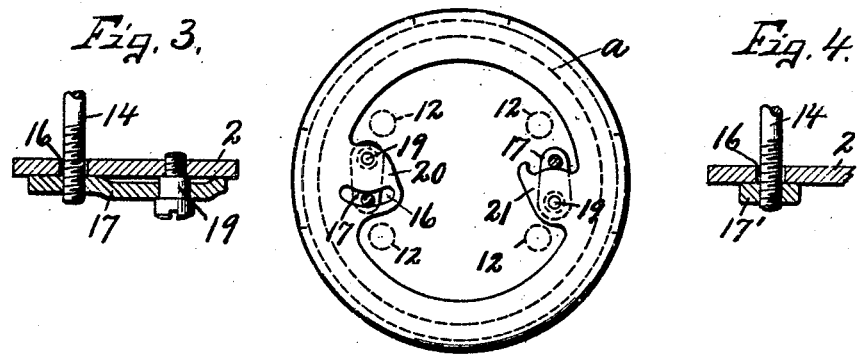
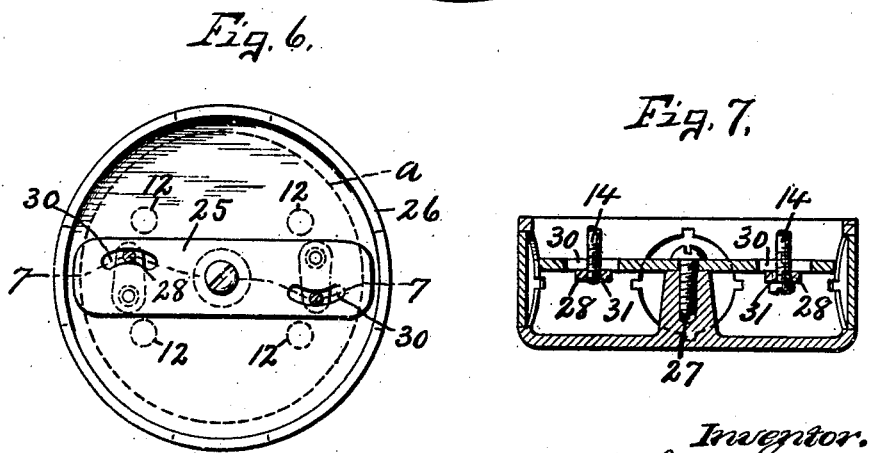
Witnesses.
H. Thomas
H. E. Chase
Inventor.
J. N. Scism
By
Howard P. Denton
Attorney.

UNITED STATES PATENT OFFICE.

JOHN N. SCISM, OF SYRACUSE, NEW YORK.

JUNCTION-BOX.

No. 904,458.

Specification of Letters Patent.

Patented Nov. 17, 1908.

Application filed January 13, 1908. Serial No. 410,647.

*To all whom it may concern:*

Be it known that I, JOHN N. SCISM, of Syracuse, in the county of Onondaga, in the State of New York, have invented new and useful Improvements in Junction-Boxes, of which the following, taken in connection with the accompanying drawings, is a full, clear, and exact description.

This invention relates to certain improvements in junction boxes to which may be attached a great variety of suitable fixtures for concealed or exposed electric conduit systems. Those fixtures vary materially in form and function and are frequently provided with bases of insulating material or cast metal having apertures therein for the reception of fastening screws or bolts adapted to be registered with corresponding apertures in some integral or detachable part of the body or cap of the box. In practice, it is frequently found that the screw receiving apertures in the porcelain or cast metal fixture fail to coincide with those in the box to which the fixture is to be attached, thus rendering the operation of assembling the parts more or less troublesome and laborious if not impossible without redrilling the holes in said junction box or its cap to correspond with those in the fixture.

One of the essential objects, therefore, of my present invention is to provide means whereby the distance between the threaded attaching elements in the junction box may be readily adjusted to bring their apertures into registration with those in the fixture or part of said fixture which is adapted to be assembled in or upon said box. For this purpose, I provide the junction box with suitable attaching elements such as arms or plates which are adjustable to various positions thereon and are provided with means for receiving the attaching devices by which the fixture may be secured to the box.

Another object is to provide the junction box with a series of branch openings and an outlet nipple capable of being secured to the box in alinement with any one of the apertures so that more than one side of the box may be presented and secured to the pipe or casing through which the electric conduits lead to the junction box.

A further object is to render the adjustable arms self-sustaining in their adjusted position by friction which enables them to be moved or adjusted by hand without liability of becoming displaced by any reasonable handling when once adjusted.

Other objects and uses will be brought out in the following description.

In the drawings—Figure 1 is a top plan partly in section of a junction box embodying the various features of my invention. Fig. 2 is a transverse sectional view taken on line 2—2, Fig. 1. Fig. 3 is an enlarged sectional view taken on line 3—3, Fig. 1. Fig. 4 is a sectional view similar to Fig. 3 showing a slightly modified form of adjustable arm. Fig. 5 is a top plan of a further modified form of box in which the apertured adjustable arms are mounted upon diametrically opposite ears on the face of the box. Fig. 6 is a top plan of a further modified form of box showing a removable interior clamping base as provided with the adjustable apertured arms, and Fig. 7 is a sectional view taken on line 7—7, Fig. 6.

In Figs. 1 and 2 I have shown a circular junction box —1— as provided with a removable cap —2— having a transverse bar —3—, the central portion of which is depressed within the box and provided with a central aperture —4— for receiving a clamping screw —5— which engages a threaded aperture in a hub —6— rising centrally from the bottom or back of the box, the clamping screw serving as a movable means for retaining the cap upon the box and permitting its removal when desired. This box is provided with a series of knock out plugs or disks —1'— normally filling branch openings —7— in the sides and back of said box so that any one or more of them may be removed under a comparatively light pressure or blow by a suitable instrument to permit electric wires to be led into or from the interior of the box, which is provided with a nipple —9— made separate therefrom and adapted to be registered with any one of the branch openings —7— said nipple being provided at its inner end with an annular flange —10— portions of which are spread laterally into recesses —11— in the sides of the opening and clenched on the inner side of the box to retain the nipple in place against turning or radial movement. The object in making the nipple separate is to permit the use of different sizes according to the size of the opening and at the same time to permit it to be attached to any one of the openings —7—.

An annular ring —13— is inserted in the nipple at the end of the threaded portion where it protrudes inwardly slightly beyond the inner face of the adjacent end of the pipe —b—, to afford a bearing for and to protect the insulation of the wire against abrasion or injury by being drawn against the sharp edges of the pipe when being passed into or from the box. The wires are brought through the nipple into the interior of the box where they may be attached to the fixture on the box or diverted through one or more openings in the side or bottom of said box.

The cap or plate —2— which extends across and is engaged with the open side of the box is provided with openings on opposite sides of the transverse bar —3— to permit access to the interior without removing the cap and serves as a means of support for a switch base or other fixture as —a—. These fixtures are usually made of porcelain or other cast material with suitable apertures —15— therein for receiving fastening members —14— which are attached to the cap or some other portion of the junction box, the portion of the box which is adapted to receive said fixture being provided with corresponding apertures —16— for receiving said fastening means.

The distances between the apertures in the fixture —a— is liable to vary more or less from the distances between the apertures —16— in the plate or the portion of the box to which the fixture is secured and in order that the difficulties of assembling the fixture upon the box due to such unequal spacing of the apertures may be overcome, the apertures —16— are preferably elongated diametrically or in curved lines extending diametrically, the elongation of said apertures affording greater range and quicker adjustment of the attaching element for the fixture inasmuch as it permits the attaching screw to be shifted lengthwise of the slot.

Associated with each slot or elongated aperture —11— is an adjustable arm —17— having a threaded aperture in registration with its slot —16—. The nut of the attaching screw may be integral with one end of the arm —17— which is pivoted at its opposite end to the plate —2— as shown in Fig. 3 or may be a separate nut as shown in Fig. 4. These adjustable arms —17— in this instance are pivoted at —19— to the under side of the cap or plate —1— at one side of their respective slots —16— and transversely across said slots which latter are concentric with their corresponding pivots —19— so that by swinging the arms upon their pivots the threaded apertures —13— are shifted toward and from the center of the box and are kept in registration with their respective slots thus permitting the threaded apertures on the adjustable arms to be brought into registration with the corresponding apertures in the fixture or any other device which it may be desired to attach to the junction box. The openings at the opposite sides of the transverse bar —3— serve also to receive the electric wires and are registered with suitable apertures —12— in the fixture —2— as shown by dotted lines in Fig. 1, said wires being omitted.

The free ends of the arms —17— are tightened or tensioned so as to frictionally engage the under side of the part —2— to which they are attached so as to prevent their accidental displacement when adjusted to receive the screws —14— by which the fixture is fastened to the box. This frictional engagement may be produced by bending the free end of the arm —17— so as to bring it against the under side of the part —2— as shown in Fig. 3 or a nut —17'— may be employed as shown in Fig. 4 to engage the under side of the cross bar or cap.

In the box shown in Fig. 5, the cross bar is omitted and the top of the box is formed with inwardly projecting ears —20— and —21—, one of which is provided with a slot —16— concentric with the pivot —19— of the arm —17— although it is clearly evident that the essential feature of the box is that it is provided with pivoted or adjustable fastening members which may be attached in any desired manner about any part of the box where it may be desired to permit their adjustment to bring their threaded apertures toward and from each other to conform to the position of the clamping screws as —14— by which the fixture or other device is attached to the box.

In Figs. 6 and 7 I have shown a box similar to that seen in Figs. 1 and 2 except that the cross bar as —25— is located wholly within the box and is connected to the center of the box —26— and secured thereto by suitable fastening means as a screw —27—, said cross bar —25— being provided with adjustable arms —28— similar to those shown in Figs. 1 to 4 inclusive while the cross bar —25— is provided with curved slots —30— at opposite sides of its center and in registration with the threaded apertures as —31— in the free ends of the arms —28—.

It is my purpose to make the box proper from sheet metal but it may also be made from cast metal while the cap —2— may be made of the same or insulating material but preferably of metal so as to better withstand any strains to which the fixture connected thereto may be subjected.

What I claim is:

1. A junction box consisting of a metal shell open at one side, a metal plate extending across the open side of the shell, arms pivoted to said plate and having threaded apertures at one side of their pivots, the portions of the arms having the threaded apertures being movable toward and from each other, and yielding means for frictionally retaining the arms in their adjusted positions.

2. A junction box comprising a metal shell open at one side, a plate extending across said opening and removably secured thereto, separate arms pivoted to the under side of said plate and extending in opposite directions from their pivots, the free ends of said arms being provided with threaded apertures some distance from their pivots, said plate being provided with slots registering with the threaded apertures and concentric with the pivots.

3. A junction box comprising a shell having a closed bottom and an open top, a plate extending across the opening and removably secured to the shell, arms pivoted to the under side of the plate and extending some distance laterally from their pivots, the free ends of said arms being provided with threaded apertures, said plate being provided with elongated openings concentric with the pivots and registering with said threaded apertures.

4. A junction box comprising a shell having a closed bottom and an open top, a plate extending across the opening and removably secured to the shell, arms pivoted to the under side of the plate and extending some distance laterally from their pivots, the free ends of said arms being provided with threaded apertures, said plate being provided with elongated openings concentric with the pivots and registering with said threaded apertures, and means for frictionally holding the arms in their adjusted positions.

In witness whereof I have hereunto set my hand this 28th day of December 1907.

JOHN N. SCISM.

Witnesses:
H. E. CHASE,
C. M. McCORMACK.